Nov. 30, 1971　　　G. J. AKERS ET AL　　　3,623,222
DOUBLE GRIP PRUNER
Filed Oct. 16, 1969　　　3 Sheets-Sheet 1
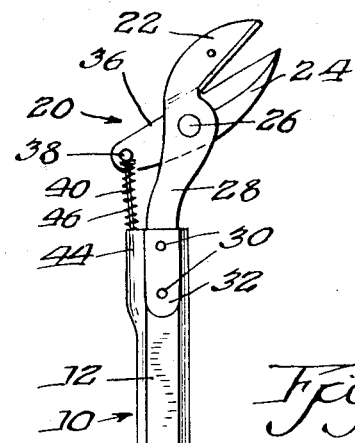
Fig. 1
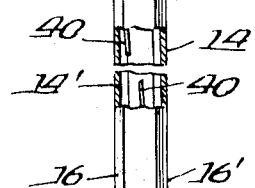
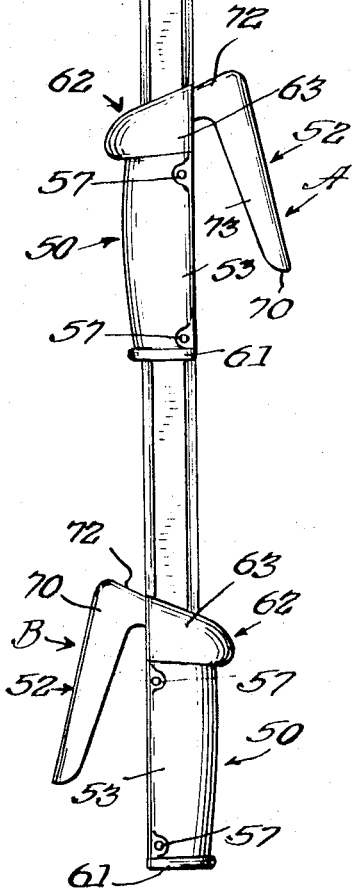
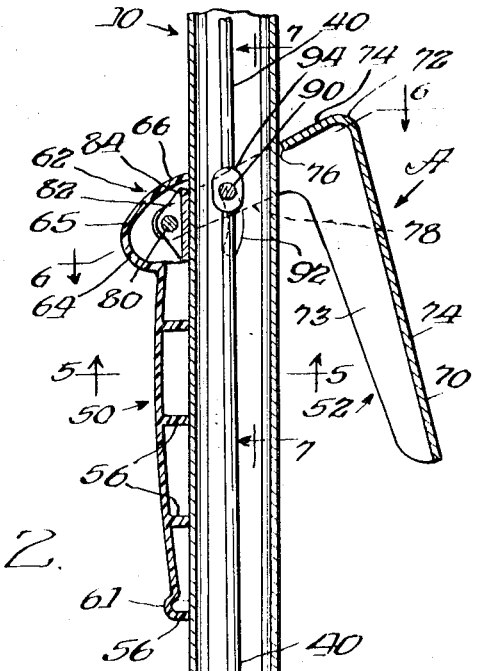
Fig. 2
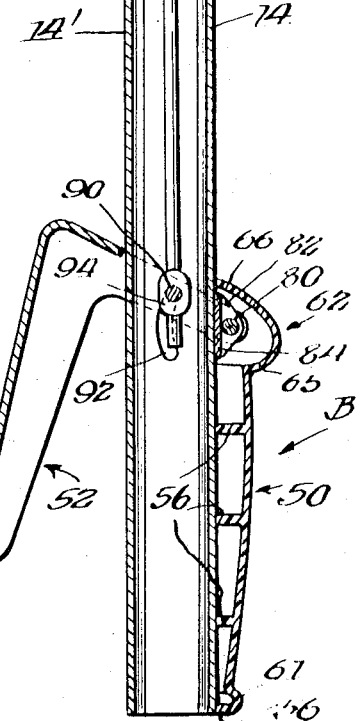
Inventors.
George J. Akers, &
Wilfred M. McCord, Jr.
By Johnson, Dienner, Emrich, Verbeck & Wagner
Attys.

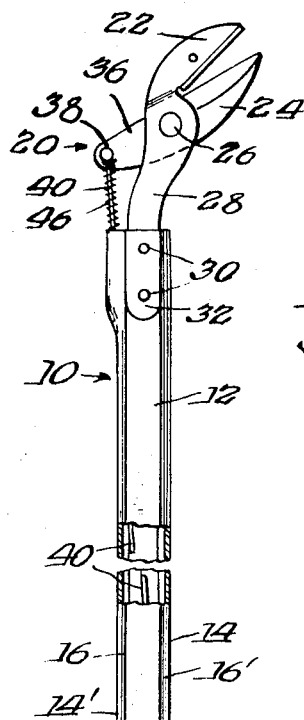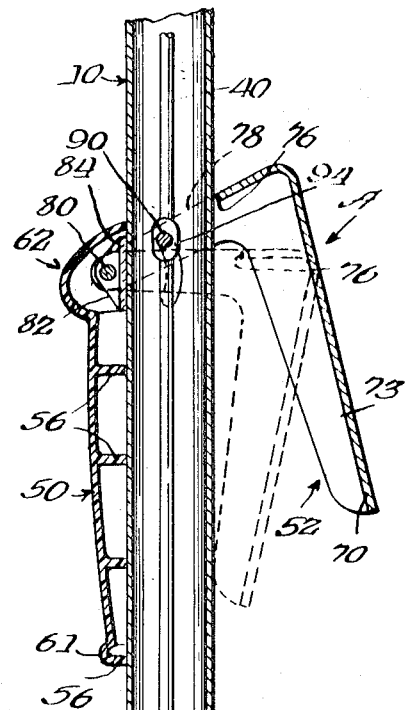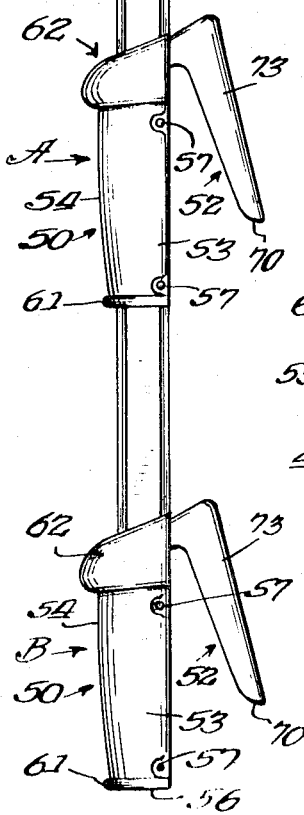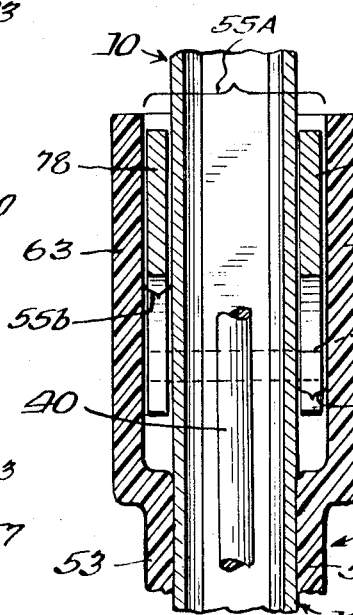

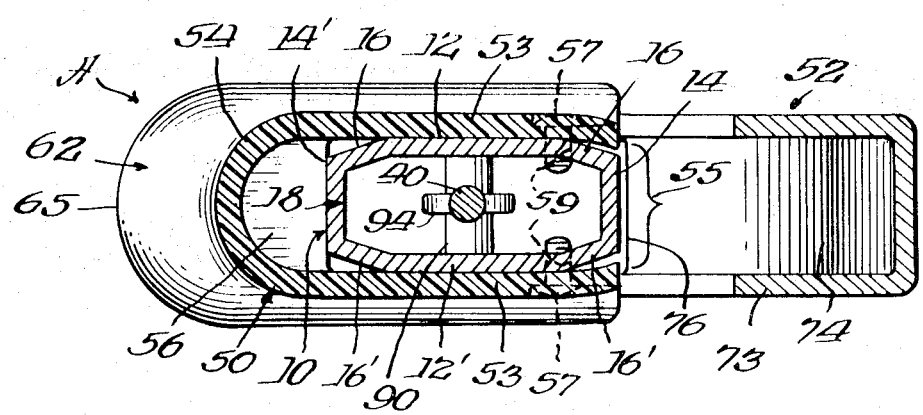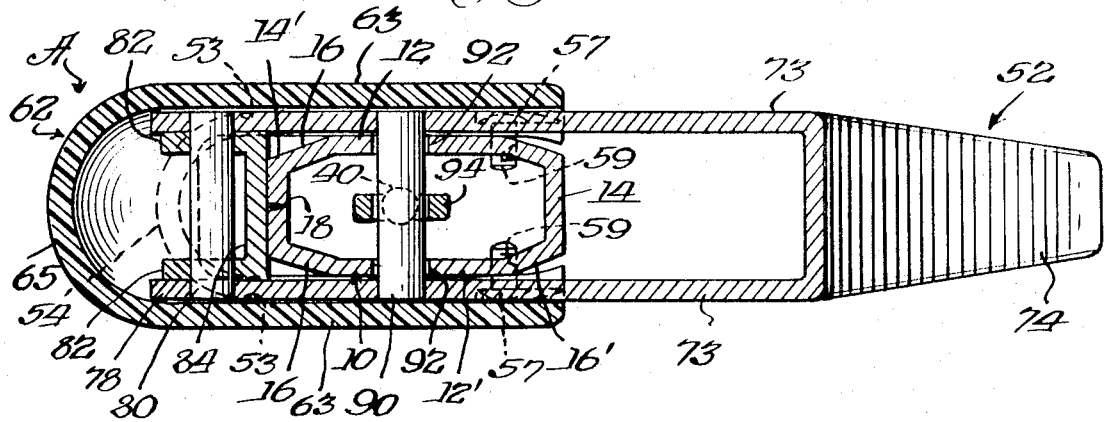

DOUBLE GRIP PRUNER

George J. Akers and Wilfred M. McCord, Jr., Louisville, Ky., assignors to Vermont American Corporation, Louisville, Ky.
Filed Oct. 16, 1969, Ser. No. 867,029
Int. Cl. B26b 17/02
U.S. Cl. 30—190
12 Claims

ABSTRACT OF THE DISCLOSURE

A pruner comprising two separated squeeze-grip operating handles adapted for simultaneous squeeze-grip operation by both hands for increasing the cutting power transmitted to the pruner cutting jaws; and which operating handles are in longitudinally spaced relation along the pruner shaft to facilitate the maneuvering of the jaws relatively to the branches of a tree, bush or the like.

---

The present invention relates to pruners for pruning the branches of trees, bushes and the like. More particularly, the invention is directed to that type of pruner comprising a supporting shaft of substantial length, a cutting head at the upper end thereof comprising relatively movable cutting jaws, and handle means at the lower end thereof for maneuvering said cutting head relatively to the branches of trees, bushes and the like and for actuating said cutting jaws.

The primary object of the invention is to increase the cutting power which can be transmitted to the pruner jaws, by providing two squeeze-grip operating handles connected to the jaws for simultaneous operation by both hands.

Another object of the invention is to facilitate the maneuvering of the cutting head relative to the branches of the tree or bush, by mounting the two operating handles in longitudinally spaced relation along the shaft of the pruner. This enables the two hands to more easily cooperate in maneuvering the cutting head upwardly and downwardly, or forwardly and backwardly, or laterally to right and left, for getting the jaws of the cutter head into cutting embrace on the particular branch which it is desired to cut. When operating at a substantial angle, the long length of the pruner shaft and the overhanging weight thereof and of the cutting head frequently require the exertion of some substantial effort to maneuver the pruner. This is readily accommodated in our present construction by reason of the substantial longitudinal spacing between the upper and lower handles along the shaft, which enables the shaft and the two handles to function as a lever system of first and third class levers in the maneuvering of the pruner. By providing the means for operating the jaws at the same location where one grips the shaft for maneuvering the pruner into cutting position, there is no need to shift either hand to a different location to effect the cutting action.

Other objects, features and advantages of the invention will become apparent from the following detailed description of two preferred embodiments thereof. In the accompanying drawings illustrating such embodiments:

FIG. 1 is a side elevation of one embodiment in which the two operating handles are located on opposite sides of the pruner shaft;

FIG. 2 is a fragmentary longitudinal sectional view on a larger scale, through the handle end of this embodiment;

FIG. 3 is a side elevation of a second embodiment in which the two operating handles are located on the same side of the pruner shaft;

FIG. 4 is a view similar to FIG. 2 of this second embodiment; and

FIGS. 5, 6 and 7 are enlarged sectional views taken approximately on the planes of the line 5—5, 6—6 and 7—7 respectively of FIG. 2.

The pruner comprises a tubular shaft 10, preferably made of sheet metal, such as steel, and being of any desired sectional form, such as round, oval, square, hexagonal, octagonal or the like. In FIGS. 5 and 6, we have shown a relatively high, narrow octagonal section of shaft comprising relatively high flattened side walls 12, 12', substantially shorter front and rear walls 14, 14' and relatively narrow diagonal corner walls 16, 16'. The edges of the sheet metal blank are preferably welded together at 18, in one of the front or rear walls 14, 14'. The foregoing is merely illustrative and may be substituted by any other tubular sectional form desired.

Mounted on the upper end of this tubular shaft 10 is the cutting head, designated 20 in its entirety (see FIG. 1). This comprises a fixed cutting jaw or blade 22 and a movable cutting jaw 24, which is pivotally mounted on the fixed jaw by the pivot pin 26. The fixed jaw 22 has a fixed mounting shank 28 which extends into the semi-flattened upper open end 32 of the tubular shaft 10, where it is attached by transverse rivets, bolts, screws, or the like, 30. The two cutting jaws 22 and 24 preferably project in a diagonal direction upwardly and forwardly from what may be regarded as the front side of the tubular shaft 10, represented by the front wall 14 of FIGS. 1, 5 and 6.

The movable cutting jaw 24 is provided with a rearwardly extending operating arm 36 having pivotal attachment at 38 to the upper end of a tension member, shown as an actuating rod 40. This pivotal attachment 38 may be of any suitable form, such as a laterally bent end of the rod 40 passing through a pivot hole in the operating arm 36, or in the form of a separate pivot bolt. The actuating rod 40 enters the upper end of the tubular shaft 10, preferably in back of the mounting shank 28, where the upper end portion of the tubular shaft 10 may be swaged outwardly along the back edge of the shank 28, as indicated at 44, to accommodate the entrance of this reciprocable rod 40. A compression spring 46 surrounds this upper portion of the actuating rod 40, being compressed between the upper edge of the tubular shaft 10 and the pivotal connection 38, whereby the spring normally tends to hold the movable cutting jaw 24 in its normal open position, and the actuating rod 40 raised into its normal upper position.

The operating rod 40 extends down through the tubular shaft 10 to approximately the lower end thereof, where it has connection with the aforementioned squeeze-grip operating handles designated A and B, located at longitudinally spaced points along the lower portion of the tubular shaft. The longitudinal spacing of the two operating handles along the shaft 10 is preferably made sufficient so that substantial leverage can be exerted on the shaft through the two handles to readily maneuver the cutting head 20 relatively to the tree branches.

In the embodiment illustrated in FIGS. 1 and 2, the two handle assemblies A and B are mounted on the tubular shaft 10 in different angularly related positions around the axis of the shaft; the position of the squeeze-grip operating lever 52 of the handle assembly denoting the position of the handle assembly around the axis of the tubular shaft 10. For example, they are shown as being angularly positioned on opposite sides of the tubular shaft, i.e. 180° apart. Also, the upper handle assembly A is shown as projecting forwardly from the front side 14 of the tubular shaft (i.e., in the same direction as the cutting jaws 22, 24), while the lower handle assembly B is shown as projecting rearwardly from the rear side 14' of the shaft; although this relation may be reversed if desired. Also, it is to be understood that the handles can be located at different intermediate angular relationships between 0° and 180°, or between 180° and 360°. A different angular relationship is illustrated in the other embodiment illustrated in FIGS. 3 and 4, to be later described.

Referring now to the structural details of the handle assembly, the same construction is employed for both handles A and B, and hence a detailed description of one will suffice for both. As best shown in FIGS. 2 and 6, the handle assembly A comprises a stationary finger grip portion 50 and a pivoted L-shaped lever portion 52. The finger grip portion 50 is preferably composed of a suitable plastic material, and is of U-shaped cross-section comprising spaced sidewall portions 53 and a connecting bight portion 54, defining therebetween a longitudinal slot 55 (FIG. 5) which fits over the flattened sides 12, 12" of the tubular shaft 10. The under side of the plastic finger grip portion 50 is reinforced by integral transverse ribs 56. This plastic finger grip is preferably secured to the tubular shaft by screws, or the like 57, which pass through holes in the edges of the side portions 53 and screw into holes 59 (FIG. 5) in the tubular shaft 10. These screws 57 may be of the self-tapping type for screwing into unthreaded holes 59 in the tubular shaft 10. The lower end of the grip portion has formed integrally therewith an outwardly projecting bead 61 to prevent the operator's hand from slipping off this lower end. The upper end of the grip 50 has formed integrally therewith an upper enlarged housing portion 62 which prevents the operator's hand from slipping off this upper end, and which also houses the pivoted end of the lever 52, as will be presently described.

The enlarged housing portion 62 comprises outwardly spaced parallel side walls 63 (FIG. 7) and an integral end wall 64 comprising an outwardly curved portion 65 and a diagonally slanting portion 66 (FIG. 2). As shown in FIG. 7, the outwardly spaced parallel side walls 63 extend integrally from the parallel side walls 53 of the finger grip portion 50, but have their inner surfaces spaced further apart to form therebetween a slot 55a which is coextensive with but is wider than the slot 55 formed in the underside of the finger grip portion 50. The greater width of this latter slot 55a defines spaced parallel slot-like areas 55b (FIG. 7) on opposite sides of the tubular shaft 10, between the metallic side walls 12, 12' of the shaft 10 and the plastic side walls 63 of the housing 62. Extending upwardly through these slot-like areas 55b are the spaced pivotal side arms 78 of the operating lever 52.

Referring now to said operating lever 52 (FIG. 2), this is shown as being in the form of an L-shaped metallic stamping or casting, preferably of steel, comprising a finger gripping portion 70 and an angularly extending swinging arm portion 72. Both portions are preferably of U-shaped cross section, comprising parallel side flanges 73 joined by a bight portion 74. The bight portion 74 of this U-shaped section in the swinging arm portion 72 terminates in an edge or shoulder 76, which, if desired, may be arranged to strike the adjacent wall of the hollow shaft 10 to thereby form an end stop for limiting the motion of the lever 52 in an outward direction. Beyond this edge or shoulder 76 the parallel side flanges 73 of the swinging arm portion 72 continue in the form of spaced pivotal arms 78 to their point of pivotal mounting on the outer ends of a transverse pivot pin 80. This pivot pin 80 is mounted in the upstanding ears 82 at the outer ends of a U-shaped pivot bracket 84 (FIG. 6), which is welded or otherwise secured to the tubular shaft 10, within the enlarged housing portion 62. The spaced pivotal arms 78 extend up through the spaced slot-like areas 55b (FIG. 7).

The operative connection between the lever 52 and the reciprocable actuating rod 40 comprises a transverse actuating pin 90 having its ends mounted in the spaced side arms 78 of the operating lever 52. This transverse actuating pin 90 extends through arcuate slots 92 in the side walls 12, 12' of the hollow shaft 10, which slots are curved concentrically of the axis of the mounting pin 80, to accommodate the swinging movement of the lever side arms 78.

Within the hollow shaft 10, the actuating pin 90 passes pivotally through a widened pivot lug 94 which is formed in the reciprocable actuating rod 40. It will thus be seen that inward squeezing pressure exerted against the lever 52 will tend to swing the actuating pin 90 in a direction away from the upper end of the shaft 10 for reciprocating the actuating rod 40 downwardly to move the movable pruning jaw 24 toward closed position.

The lower handle assembly B of the embodiment shown in FIGS. 1 and 2 is of the construction and has the same mode of operation as the upper handle assembly A, but is disposed in a position substantially 180° therefrom to project reversely outwardly from the rear side of the tubular shaft 10. This reversed arrangement enables the operator to grasp the two handles with a reversed hand grip if he so desires. It also enables a left-handed operator to grasp the two handles with a reversed hand grip from a right-handed operator if this seems more convenient to him. In either case, the simultaneous squeezing of both handles transmits substantially twice the cutting power to the cutting head 20, than is possible with only a single handle. Also, the substantial longitudinal spacing between the two handles along the pruner shaft, gives the two handles substantial leverage, comparable to first and third class levers, for readily maneuvering the cutter head 20 relative to the three branches. If desired, the two handles A and B may be mounted in reversed relation from the arrangement shown in FIGS. 1 and 2, i.e., with the upper handle A projecting from the rear side of the shaft 10, and the lower handle B projecting from the front side of the shaft 10.

Referring now to the modified embodiment illustrated in FIGS. 3 and 4, in this arrangement the upper handle assembly A is still positioned to project forwardly from the front side of the tubular shaft 10, the same as in FIGS. 1 and 2. However, the lower handle assembly B is rotated through substantially 180° from its rearwardly projecting position shown in FIGS. 1 and 2, into a forwardly projecting position, the same as the upper handle A. The internal connection of the finger lever 52 with the actuating rod 40 in this lower handle assembly B is the same as in the upper handle assembly A. The forward edge of the lower shaft portion is provided with properly aligned holes to receive the fastening screws 57 in this different position of the lower handle B. The double grip handling of this modified embodiment of FIGS. 3 and 4 still gives the increased power for operating the cutter head. If desired, the two handle assemblies A and B may be arranged to both project rearwardly from the rear side of the tubular shaft 10.

We wish it to be also understood that one or both handle assemblies may be arranged to project laterally from either side of the flattened tubular shaft 10, or at any intermediate angle, instead of forwardly or rearwardly therefrom.

While we have illustrated and described what we regard to be the preferred embodiments of our invention, nevertheless it will be understood that such are merely exemplary and that numerous modifications and rearrangements may be made therein without departing from the invention.

We claim:

1. A double grip pruner comprising a pruner shaft, cutting mechanism carried on the upper portion of said shaft comprising relatively movable cutting jaws, actuating means connecting with said cutting mechanism and extending down lengthwise of said shaft, and two squeeze-grip operating handles mounted in longitudinally spaced relation along the lower portion of said shaft, each said handles comprising a finger grip portion stationarily mounted on said shaft, and at least one said handles having a lever portion pivotally mounted on said shaft and connected with said actuating means, said handles being adapted for grasp by an operator to facilitate maneuvering the pruner and simultaneous squeeze-grip operation in the actuation of said cutting jaws.

2. The pruner of claim 1 wherein said two squeeze-grip operating handles are mounted in angularly spaced relation around said shaft.

3. The pruner of claim 1 wherein said operating handles project from opposite sides of said shaft.

4. The pruner of claim 1 wherein said operating handles project from the same side of said shaft.

5. The pruner of claim 1 wherein said actuating means comprises a single actuating member connecting with both of said operating handles.

6. The pruner of claim 1 wherein said shaft is tubular, and said actuating means extends downwardly therein.

7. The pruner of claim 1 wherein said two operating handles are both of the same construction.

8. The pruner of claim 1 wherein each of said operating handles comprises a lever portion pivotally mounted on said shaft.

9. A double grip pruner comprising a tubular pruner shaft, cutting mechanism carried on the upper portion of said shaft comprising relatively movable cutting jaws, actuating means connecting with said cutting mechanism and extending downwardly in and lengthwise of said shaft, and two squeeze-grip operating handles mounted on the lower portion of said shaft, one of said operating handles comprising a handle lever having spaced pivot arms embracing said tubular shaft, pivot means pivoting said pivot arm to said shaft, and actuating pin means extending between said pivot arms through said tubular shaft and operatively connected with said actuating means, said handles being adapted for simultaneous squeeze-grip operation in the actuation of said cutting jaws.

10. The combination of claim 9 which also includes a finger grip portion having housing means which covers said pivot arms, said pivot means and said actuating pin means.

11. The pruner of claim 6 wherein one of said jaws is secured by a shank portion in the upper end of the tubular shaft alongside the actuating means which comprises a rod.

12. The pruner of claim 11 wherein the rod extends outwardly of the end of the shaft and is pivotally connected with the other jaw which is pivotally mounted on the shank of the first jaw.

References Cited

UNITED STATES PATENTS

| | | | |
|---|---|---|---|
| 596,890 | 1/1898 | Le Sage | 30—245 |
| 2,070,225 | 2/1937 | Dickson | 30—245 |

FOREIGN PATENTS

| | | | |
|---|---|---|---|
| 600,900 | 4/1948 | Great Britain | 30—249 |

ROBERT C. RIORDON, Primary Examiner

J. C. PETERS, Assistant Examiner